INVENTORS
MELVIN F. SILVERSTEIN
NICHOLAS DE CLARIS
BY
Ezekiel Wolf, Wolf & Greenfield
ATTORNEYS April 12, 1966 M. F. SILVERSTEIN ETAL 3,246,297

RECOGNIZER APPARATUS RESPONSIVE TO A PREDETERMINED RELATION OF PLURAL SIGNALS

Filed Oct. 16, 1961

5 Sheets-Sheet 2

INVENTORS
MELVIN F. SILVERSTEIN
NICHOLAS DE CLARIS

BY

Ezekiel Wolf, Wolf & Greenfield

ATTORNEYS

FIG. 5
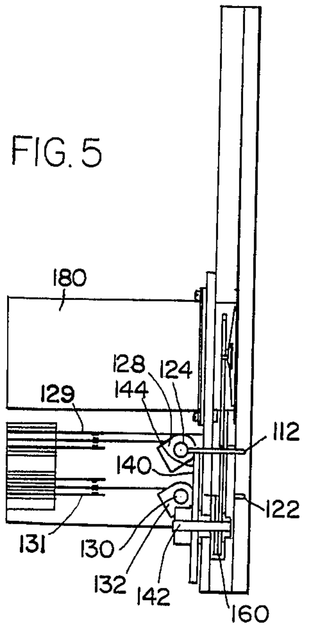
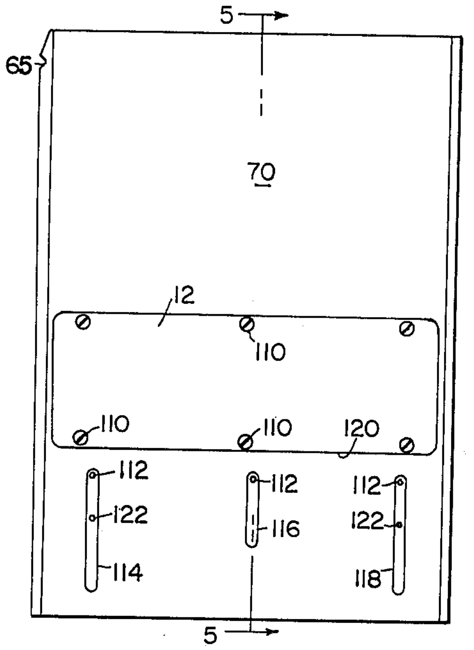
FIG. 4
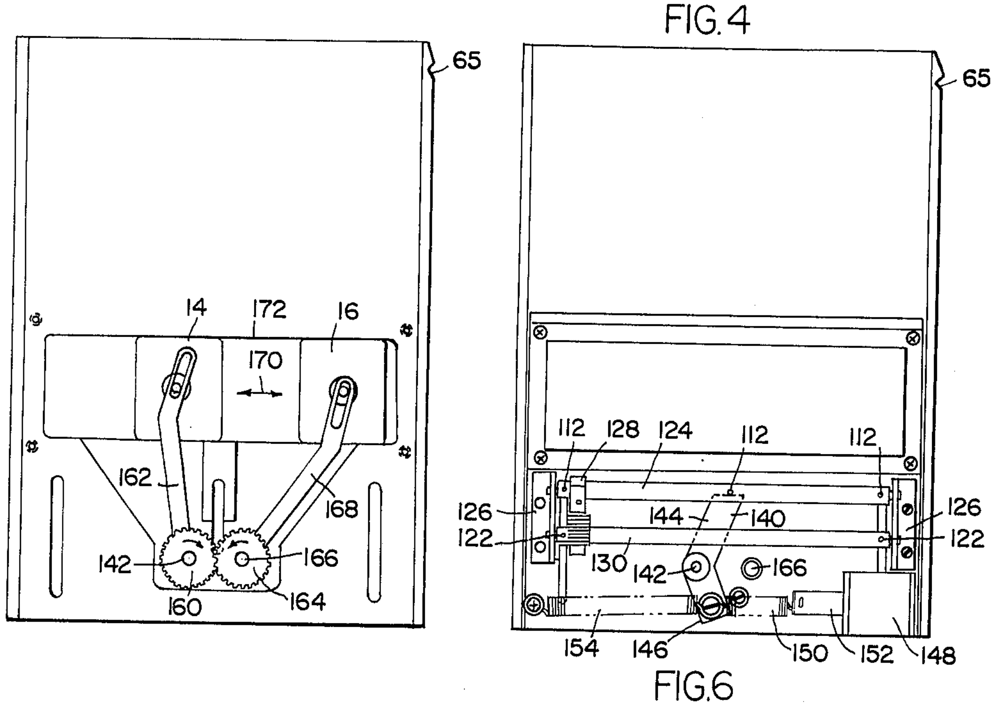
FIG. 6
FIG. 7
INVENTORS
MELVIN F. SILVERSTEIN
NICHOLAS DE CLARIS
BY
Ezekiel Wolf, Wolf & Greenfield
ATTORNEYS INVENTORS
MELVIN F. SILVERSTEIN
NICHOLAS DE CLARIS
BY
Ezekiel Wolf, Wolf & Greenfield
ATTORNEYS INVENTORS
MELVIN F. SILVERSTEIN
NICHOLAS DE CLARIS
BY
*Ezekiel Wolf, Wolf & Greenfield*
ATTORNEYS United States Patent Office 3,246,297

Patented Apr. 12, 1966

3,246,297

RECOGNIZER APPARATUS RESPONSIVE TO A PREDETERMINED RELATION OF PLURAL SIGNALS

Melvin F. Silverstein, Ithaca, N.Y., and Nicholas DeClaris, Holbrook, Mass., said DeClaris assignor, by mesne assignments, to Arcs Industries, Inc., Huntington Station, N.Y., a corporation of New York, and said Silverstein assignor to Rescon Electronics Corp., Boston, Mass., a corporation of Delaware Filed Oct. 16, 1961, Ser. No. 145,053
10 Claims. (Cl. 340—149)

The present invention relates in general to the recognition of signals and more particularly concerns a novel system for identifying a particular visibly discernible characteristic. The specific system described herein by way of example is directed toward automatically identifying currency of a predetermined denomination. This system unambiguously identifies a predetermined denomination, despite wide variations in the condition of different bills of the same denomination caused by factors such as wear, folding, and soiling. These results are obtained with a system incorporating substantially standard components capable of reliable operation for long periods of time.

In recent years the business of automatically vending products has exhibited rapid and extensive growth; however, nearly all these automatic machines are operated only by inserting coins. Since the maximum coin denomination in general use is the half-dollar, this places a serious limitation on the maximum value or products which may be automatically dispensed. While many machines are available which accept a number of coins, a prospective purchaser who does not have the required change is unable to activate the machine to dispense the desired article and numerous sales are thereby lost.

The present invention contemplates and has as an important object the provision of means for automatically recognizing currency of a predetermined denomination despite relatively wide variations in the physical characteristics of different bills of the same denomination.

It is a more general object of the present invention to recognize a predetermined characteristic in an unknown signal.

It is an object of the invention to achieve the preceding objects with apparatus relatively free from complexity to insure reliable operation for long periods of time with a minimum of maintenance.

It is still another object of the invention to achieve the preceding objects with a system which is relatively insensitive to variations in system parameters.

It is another object of the invention to provide a currency identification system arranged to minimize tampering by unauthorized persons.

It is still a further object of the invention to provide a currency identification system which returns material inserted for examination when the recognition criteria are not met.

According to the invention, first and second signals having a common characteristic are stored in a memory unit, weighted and then differently combined to provide what may be generally termed a weighted difference signal. Means responsive to the first signal, the second signal and the difference signal provides a recognition signal only when the first, second and difference signals are related in a predetermined manner. For object recognition, the first signal is representative of a first portion of the object and the second signal of a second portion thereof.

For example, when identifying a currency bill, the first portion may be the central area of the bill, while the second portion comprises the edge areas thereof.

In a preferred embodiment of the invention, a single photocell is illuminated by light from a source transmitted through the central area of the bill, and the photocell output signal is stored. Then the same photocell is illuminated by the same light source, but this time transmitted through the edge areas of the bill. This photocell output signal is also stored. The two stored signals are now weighted and differentially combined to provide a difference signal. If the two stored signals and the difference signal are all within predetermined tolerance limits, a recognition signal is provided indicating that the bill is of the predetermined characteristic. If any of the signals is outside the tolerance limits, a rejection signal is provided and the bill is ejected. The entire time required is only two seconds.

Numerous other features, objects and advantages of the invention will become apparent from the following specification when read in connection with the accompanying drawing, in which:

FIG. 4 is a plan view of the drawer subassembly of the apparatus of FIG. 2;

FIG. 5 is a side view of the drawer of FIG. 4;

FIG. 6 is a bottom view of the drawer of FIG. 4;

FIG. 7 is a bottom view on a different plane of the drawer of FIG. 4;

Figure 1:
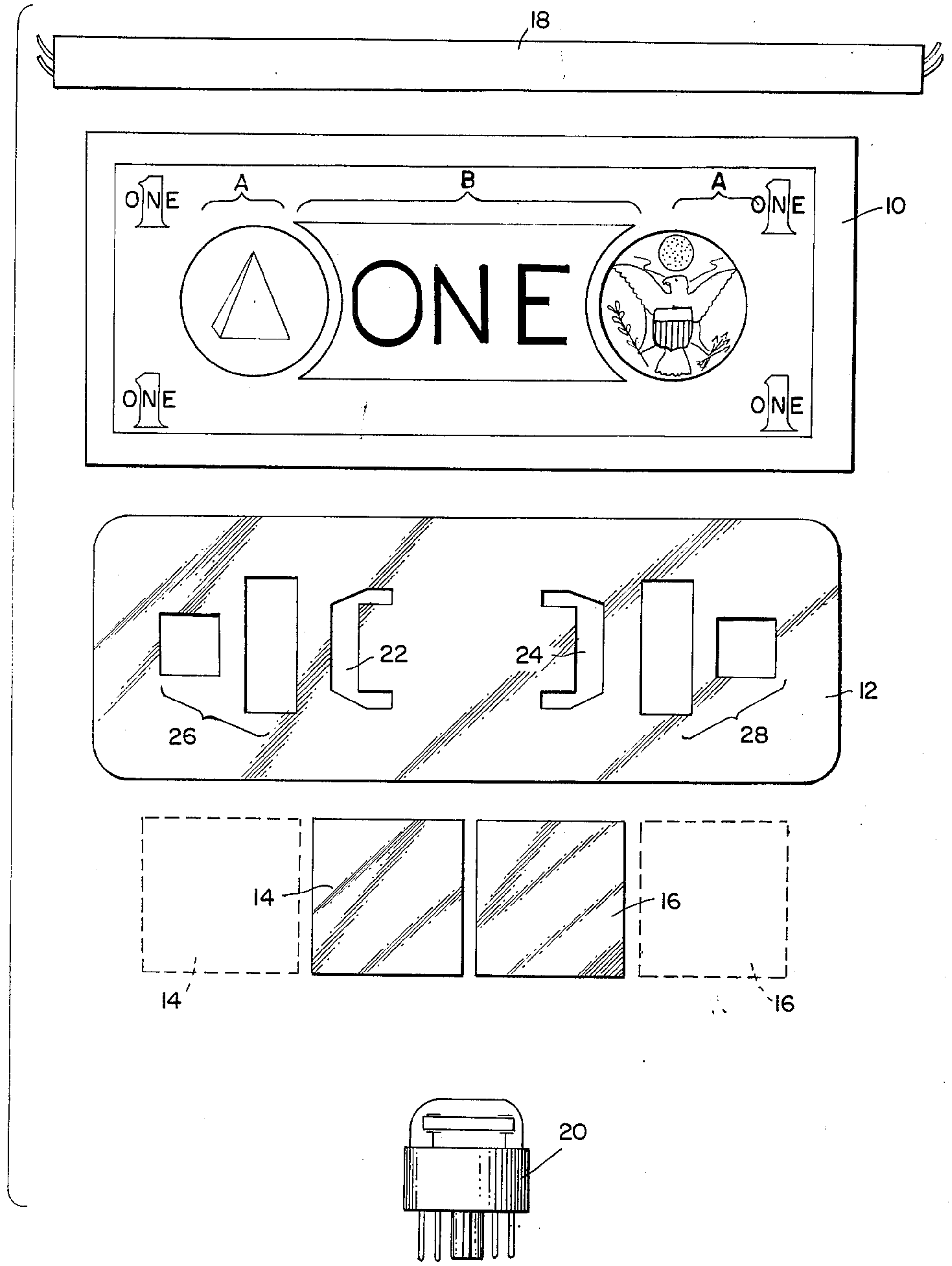
FIG. 1 is an exploded view diagrammatically illustrating the manner in which paper currency is identified in accordance with this invention.

In the exploded view of FIG. 1 a bill 10 to be recognized is shown disposed above a mask 12 upon which the bill rests during examination. The mark 12 in turn is shown disposed above a pair of shutters 14 and 16 whose positions determine the particular area of the bill being examined. A light source 18 is positioned above the bill 10 and a single photocell 20 is located below the shutters and mask, which senses the intensity of the light from the source 18 through selected portions of the bill as determined by the positions of the shutters relative to the mask 12.

The central portion of the bill is referred to in the following description as the B area while the end portions are termed the A areas, and the A and B areas are examined separately during the identification procedure. The B area of the bill is examined through the slots 22 and 24 in the mask 12 while the slots 26 and 28 in the mask permit the viewing of the A areas. When the shutters 14 and 16 are disposed in the positions shown in full lines in FIG. 1, the slots 26 and 28 are exposed and the photocell 20 may sense the intensity of the light passing through areas A. When the shutters are moved to their alternative positions suggested by the broken lines in FIG. 1, the slots 22 and 24 are exposed and the intensity of the light source 18 viewed through area B of the bill may be sensed by the photocell.

Figure 10:
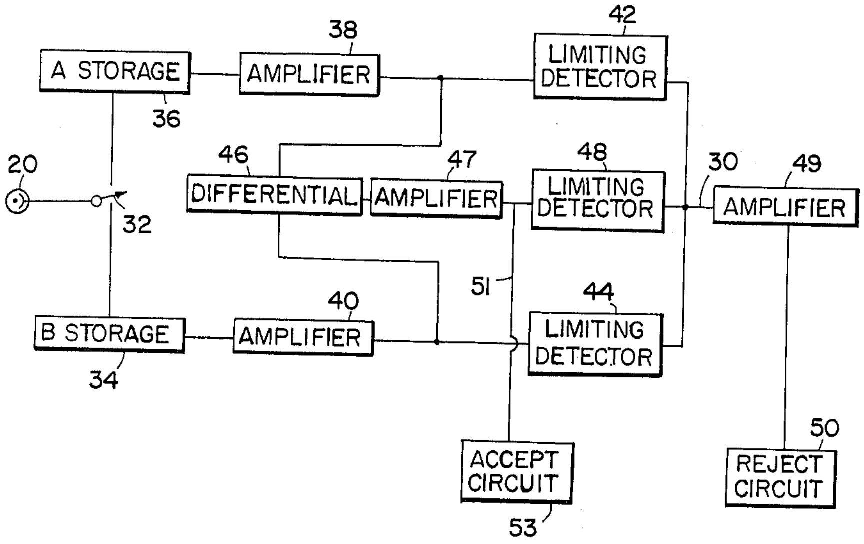
FIG. 10 is a block diagram generally illustrating the logical arrangement of a system for indicating that a bill being examined should be rejected or accepted.

In FIG. 10 a block diagram illustrates the logical arrangement of a system for providing a reject pulse in line 30 when the A and B areas of the bill photoelectrically examined produce A, B, and A–B pulses any one of which indicates that the bill under test is either a counterfeit or of a denomination other than that to be recognized.

When the B area is being examined, the switch 32 connects the photocell 20 to the B storage unit 34, and when the A area is being examined the switch 32 connects the output of the photocell to the A storage 36. The A and B storage units discharge into their respective amplifiers 38 and 40 and the amplified signals are directed to their respective detectors 42 and 44 and to the differential 46. The output of the differential 46 is directed through amplifier 47 to a third limiting detector 48. Each of the limiting detectors 42, 44 and 48 is designed to produce an output pulse in line 30 when its input pulse lies outside certain predetermined limits. If anyone of the signals directed to the limiting detectors exceeds the limit as determined by the detectors, an output pulse is amplified by amplifier 49 and directed to the reject circuit 50 to cause the apparatus to reject the bill, even if an accept pulse is also produced in line 51 shown in FIG. 10 to be connected to the output of the differential 46 through the amplifier 47. The accept circuit 53 connected to line 51 is energized whenever the differential 46 receives signals from amplifiers 38 and 40, but the circuit 53 is overriden by the reject circuit 50 if the reject circuit receives a pulse from any of the limiting detectors.

Having generally described a system according to the invention, a specific embodiment thereof will be described in detail. Referring to FIGS. 2–7, an assembly is therein shown which includes a frame 60 which carries a drawer subassembly 62, a light box 64, a transport subassembly 66 and a drive motor 68. These several parts are described separately and in detail below.

The drawer 62 carried on the frame 60 and precisely positioned by the slot 65 and positioning screw 67 includes an upper plate 70 upon which the bills are scanned by the machine. The plate 70 of the drawer 62 cooperates with an entrance guide 72 to define an entrance or feed inlet 74 through which the bills to be scanned enter the machine. The guide 72 includes a vertical face plate 76 and a horizontal panel 78, and supports fittings 80 on its opposite sides that in turn carry the shaft 82 forming part of the transport assembly 66.

Figures 2, 3:
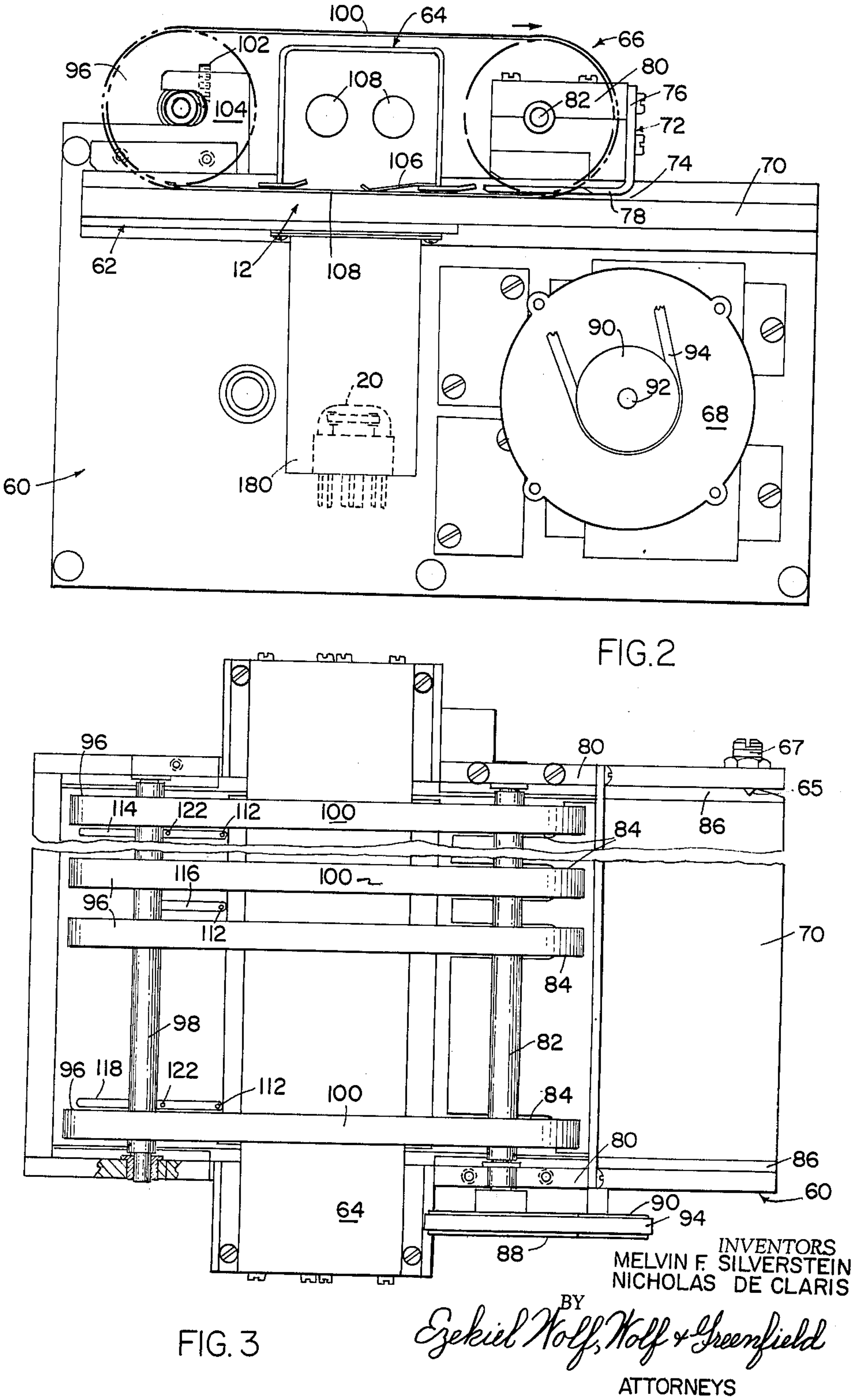
FIG. 2 is a side view of apparatus for identifying currency in accordance with this invention.
FIG. 3 is a plan view of the assembly shown in FIG. 2.

It will be noted in FIG. 3 that the shaft 82 carries four pulleys 84 spaced along the shaft. The outer pulleys of the four lie adjacent the sides of the plate 70 just inwardly of the sides 86 of the drawer, and the other two pulleys 84 lie adjacent the center line of the plate 70. As will be apparent, the space between the inner and outer pulleys is necessary to avoid interruption of the path of light from the light box to the photocell 20 through the slots 22, 24, 26 and 28 in the mask 12.

Disposed on the shaft 82 outwardly of the side 86 of the drawer is another pulley 88. The pulley 88 cooperates with the driven pulley 90 on the shaft 92 of motor 68 through the belt 94 to operate the transport mechanism 66. That is, when the motor 68 is energized and rotates the pulley 90, the belt 94 rotates the pulley 88 to turn the shaft 82 and the four pulleys 84 mounted thereon.

The pulleys 84 cooperate with an equal number of pulleys 96 carried on the idler shaft 98 to support the drive belts 100 which physically engage the bills to be guided into the machine for examination. A set screw 102 shown in FIG. 2 is adapted to bear against the idler shaft 98 to move it in its bearings 104 away from the shaft 82 to adjust the tension of the belts 100.

In FIG. 2 the belts 100 are shown to define a path of travel for the bills on the plate 70 as they are introduced into the machine. A number of springs 106, one for each belt, bear against the upper surface of the lower run 108 of the belt to urge each belt downwardly against the surface of plate 70 of drawer 62. Thus, a bill introduced into the machine at the feed slot 74 and picked up by the belts 100 is carried by the belts beneath the light box 64.

The light box 64 is in the nature of a housing and contains a pair of fluorescent lamps suggested at 108. The bottom of the housing 64 is open and the inner surface of the housing walls direct the light downwardly to the portion of the plate 70 disposed immediately beneath it. Thus, when the transport mechanism 66 deposits a bill on the plate 70 beneath the light box 64, the bill is illuminated.

Referring to FIG. 4, the plate 70 is shown to carry the mask 12 previously described in connection with FIG. 1. For clarity the slots in the mask are omitted in FIG. 4. The mask 12 is disposed immediately beneath the light box 64 when the drawer is in its assembled position. The mask 12 is secured in place over an opening cut in the plate 70 by screws 110. It will also be noted in FIG. 4 that three pins 112 extend upwardly through slots 114, 116 and 118 cut in the plate 70 and are disposed just beyond the trailing edge 120 of mask 12 with respect to the direction of feed of the bills into the machine. The pins 112 serve several functions which will become apparent from a continued reading of this specification. Disposed in the slots 114 and 118 beyond the pins 112 are a pair of pins 122 which also extend above the surface of plate 70.

In FIGS. 5 and 6 the pins 112 are shown to be supported on and extend radially from a shaft 124 in turn mounted on supports 126. A switching cam 128 is mounted of the end of shaft 124. The pins 122 are shown in FIGS. 5 and 6 to be similarly mounted on a second shaft 130 carried on the supports 126, and the shaft 130 bears switching cam 132. Cams 128 and 132 actuate the switch blades 129 and 131 respectively.

In FIG. 6 a lever 140 is shown pivotally mounted on a pivot shaft 142 and the lever has a pair of arms 144 and 146. The arm 144 is adapted to lie against the middle one of the three pins 112 to prevent that pin from being moved rearwardly in its slot 116 and consequently to prevent rotation of the shaft 124. Thus, the lever 140 serves as a stop to prevent actuation of the switch blades 129 controlled by cam 128 when the lever is in the position shown in FIG. 6. The lever 140 is actuated by a solenoid 148 through a spring 150 connected between the solenoid armature 152 and the end of the arm 146. A second spring 154 serves to bias the lever 140 in the position shown in FIG. 6. That spring 154 acts against the spring 150 and the solenoid 148.

The shaft 142 which serves as the pivotal support of the lever 140 is shown in FIG. 7 to carry a gear 160 which in turn supports shutter arm 162. A second gear 164 mounted on stub shaft 166 meshes with the gear 160 and is actuated simultaneously with it. The gear 164 carries a second shutter arm 168 shown clearly in FIG. 6.

The shutter arms 162 and 168 carry the shutters 14 and 16 respectively described in connection with FIG. 1. The shutters are adapted to move back and forth as suggested by arrow 170 in FIG. 6 guided by the track 172 and actuated by the shutter arms 162 and 168. While in FIG. 6 shutter 14 is shown in an inward position and shutter 16 is shown in an outward position, the two shutters move in tandem and both simultaneously assume inner or outer positions.

Referring again to FIG. 2, a single photocell 20 is shown mounted in the light director 180 carried by the drawer 62 beneath the mask 12, and the photocell 20 is positioned to sense the intensity of the light eminating from the fluorescent light strips 108 and passing through the bill under test at areas A or B as determined by the position of the shutters 14 and 16 with respect to the mask 12.

The light director 180 serves to average the intensity of the light passing through the particular area under test: that is, the entire sensitive area of the single photocell 20 simultaneously senses the intensity of the light passing through the full area under test. This may be achieved by forming the inner surface of director 180 of a nonreflective or highly reflective material. Typically, the inner surface of the director could be black or alternatively a highly polished cone could be disposed in the director.

Having described in detail the mechanical apparatus of this invention as well as the logical arrangement of a system for examining documents as practiced by the apparatus, the operation of the invention will now be described with particular reference to the schematic diagrams showing the switching circuits and electronic circuits in FIGS. 8 and 9.

Figure 8:
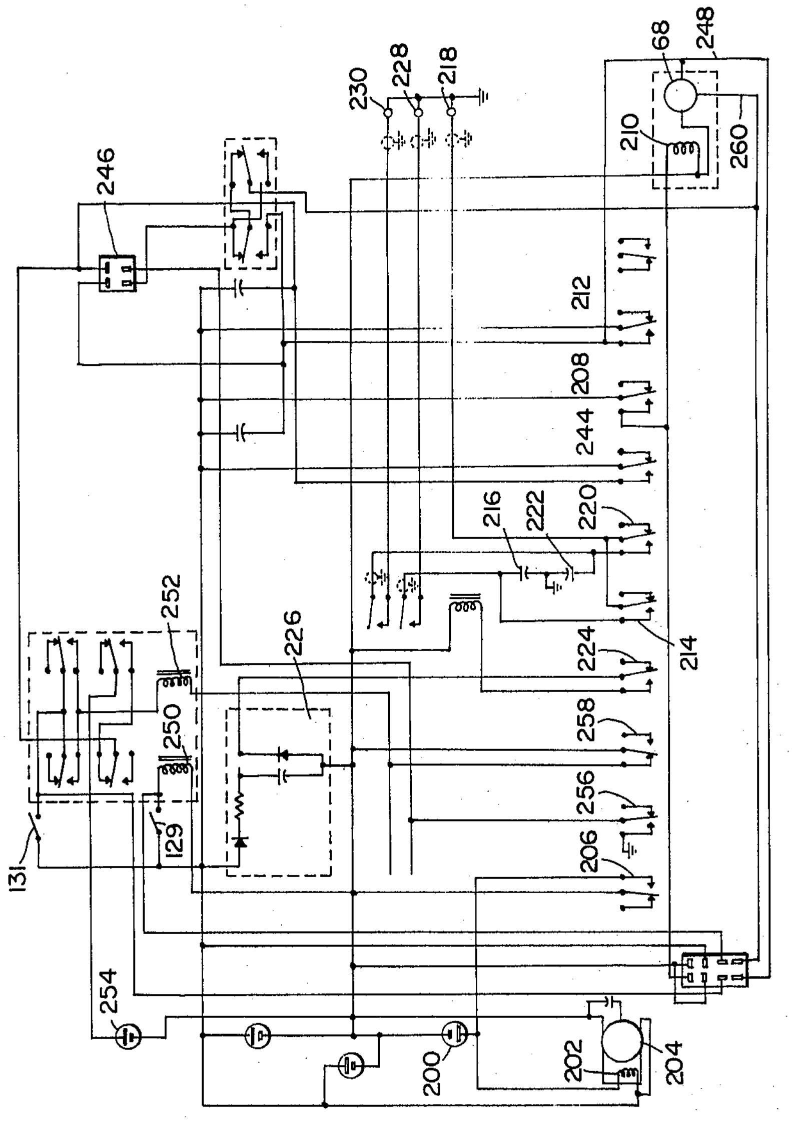
FIG. 8 is a schematic diagram of pertinent system switching circuits.

In the switching circuit of FIG. 8, an external manual starting switch 200 controls the energization of solenoid 202 to start the timer motor 204 in operation. Operation of the timer motor 204 first closes timer switch 206 to complete a circuit for the timer motor, bypassing the manual start switch 200. Thus, once the timer is initially energized by closing of the manual switch 200 it is no longer dependent upon the manual switch 200. The timer 206 remains closed throughout one full revolution of the timer at which time the contacts of the switch 206 open and the motor stops, until again manually energized.

The switch 200 is manually energized by the operator when he places a bill for examination on the plate 70 of the drawer in the inlet slot 74. Simultaneously with the closing of switch 206, the timer 204 also closes switch 208 which causes energization of the coil 210 of solenoid 148 shown in FIG. 6. Energization of the solenoid 148 causes the lever 140 to assume the position shown in FIG. 6 so that it serves as a stop preventing rotation of the shaft 124, and simultaneously moves the shutters 14 and 16 to the outer position so that they block or close the slots 26 and 28 in mask 12. Thus, the shutters 14 and 16 assume the position permitting examination of the intensity of the light passing through the bill at area B.

Still a third switch 212 is actuated with switches 206 and 208. The actuation of switch 212 energizes the motor 68 that drives the transport subassembly 64 so that the bill placed in the entrance slot 74 is conveyed by the belts 100 to a position overlying the mask 12 on the plate 70. The pins 112 are carried by shaft 124 and temporarily locked in an upright position (as shown in FIG. 3) serve to stop the forward travel of the bill and align the bill for examination above the mask 12. The switch 212 is only temporarily closed so that the motor 68 runs for only a short period just adequate to cause the belt 100 to convey the bill to the location of examination.

A predetermined time after switches 206, 208 and 212 are closed, the timer closes switch 214 for a short period adequate to allow storage capacitor 216 to charge to a voltage generated by the photocell 20 and applied through connector 218. Thus, the shutters 14 and 16 disposed in their outer positions cause the photocell 20 to examine or sense the illumination through area B of the bill placed on the mask 12, and the output signal of the photocell is stored in the capacitor 216. Subsequently, switch 208 opens causing the solenoid coil 210 to de-energize. De-energization of the solenoid 148 places the lever 140 under the influence of spring 154 which causes lever 140 to disengage the middle one of the three pins 112 so that they may move on the shaft 124, and simultaneously the spring moves the shutters 14 and 16 to an inner position whereby slots 22 and 24 are covered and slots 26 and 28 of the mask are exposed or opened. Thus, the A areas of the bill are examined by the response of the photocell 20 to the illumination from the light source 18 through the areas A. Simultaneously, switch 220 closes allowing capacitor 222 to charge to the new potential of connector 218 established by the photocell 20. Subsequently, switch 220 reopens.

By the operation described above, the response of the photocell 20 to the illumination through areas B and A is stored in the capacitors 216 and 222 respectively, as suggested in the box diagram of FIG. 10 depicting storage elements 34 and 36. With the stored signals in the storage units, the switch 224 is closed by the timer 204, to apply power to the clock relay 226. The clock relay connects the charged capacitors 216 and 222 to connectors 228 and 230 respectively. This action initiates operation of the electronic circuit of FIG. 9. It will be noted in FIG. 9 that connectors 228 and 230 are also shown and these represent the input through which the signals stored in the capacitors 216 and 222 are introduced into the electronic circuit.

Figure 9:
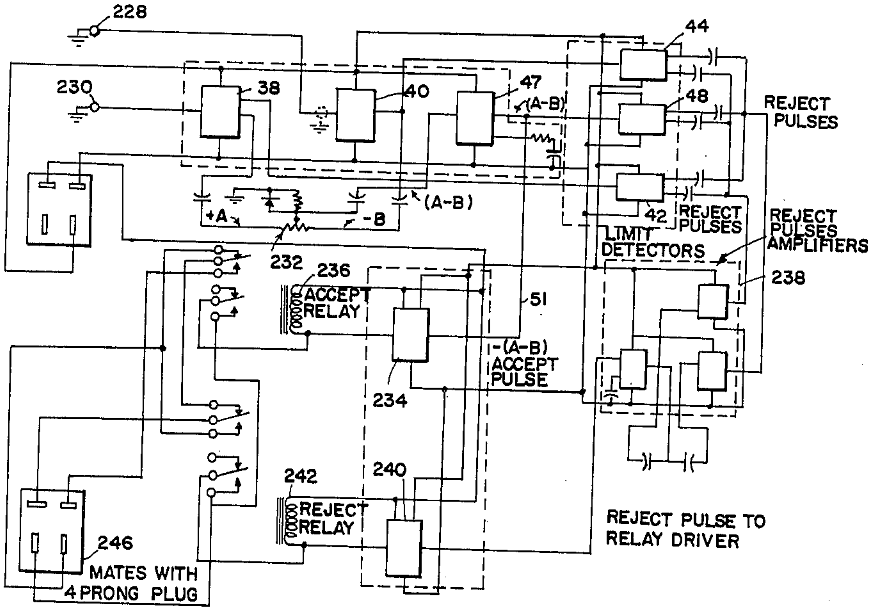
FIG. 9 is a schematic diagram of the electronic circuit for examining a bill being tested.

The respective signals stored in the capacitors are amplified by amplifiers 38 and 40 shown in FIG. 9. The output signals from the amplifiers 38 and 40 are weighted and differentially combined in the net-work 232. The output signal from amplifier 40 is inverted causing the network to produce an output signal representing A minus B. At this stage, the bill has been essentially identified since it is only the weighted and differentially combined signals which accept the bill. The limit detectors insure that the differential signal as well as the individual signals from which the differential signal is formed are in fact those which would result from the desired denomination of authentic currency.

The amplified B signal is directed to the limiting detector 44, the amplified A signal to the limiting detector 42, and the difference signal A minus B is directed to the third limiting detector 48 through amplifier 47. The amplified difference signal also creates a pulse in line 51 to energize the accept relay driver 234 causing energization of accept relay 236. The outputs of the limiting detectors 42, 44 and 48 are directed to the bank of reject pulse amplifiers 238 which correspond to the amplifier shown diagrammatically in FIG. 10 at 49. The pulses from the limiting detectors are amplified as the pulses produced by other than an authentic bill of the desired denomination may be quite small, and these pulses must be used to drive the reject relay driver 240 which in turn energizes the reject relay 242. If the limit detectors do not produce an output signal, the reject relay does not change position, and if an accept pulse is applied to the accept relay 236, the switching circuit of FIG. 8 will receive appropriate instructions from the electronic circuit of FIG. 9.

Referring again to FIG. 8, the timer 204 after closing switch 224 provides a delay period sufficient to allow completion of the electronic logic operation of the circuit of FIG. 9. Thereafter, switch 244 closes, applying power to motor 68 as determined by the position of the accept and reject relays 236 and 242 respectively. It will be appreciated that the accept and reject relays are connected through multiplug connectors 246 identified in each of FIGS. 8 and 9.

If the bill under examination is indicated as acceptable by relay 236, the motor 20 is energized through line 248, and the motor rotates in a direction to carry the bill on the mask rearwardly over the pins or combs 112 and 122 towards a bank or point of collection at the rear of the machine. The pins 112 when actuated move switches 129 to energize the relay 250, and the pins 122 when moved actuate switches 131 which control energization of the second relay 252.

The relays 250 and 252 supply a pulse to vending switch 254 only if the following sequence of operation of the switches 129 and 131 occurs. The switch 129 must be actuated before the switch 131, and the switch 129 must be released only after actuation of switch 131 and before switch 131 releases. Thus, a vend pulse is not created by the apparatus unless the bill transported by the belts 100 first actuate pins 112 to rotate shaft 124, next actuate pins 122 rotating shaft 130, thereafter releases pins 112, and lastly releases pins 122. Thus, the machine logically prevents actuation of the vending machine until it is assured that the bill has proceeded toward the bank or point of collection and has not been withdrawn by the operator after an accept condition is established by the electronic testing circuit.

Continued operation of the timer 204 causes actuation of switches 256 and 258 to reset the apparatus to a ready condition and switch 206 is released to stop the timer motor.

If the electronic circuit indicated that the bill under test was unacceptable, the reject relay 242 of the electronic circuit would cause energization of the motor 68 through line 260. This causes the motor to reverse direction and the belts 110 accordingly move the bill on the plate 70 above the mask 12 back out the entrance slot 74. As the pins 112 and 122 are not acuated as described, no vend pulse is created to cause the machine in which this invention is incorporated to dispense its merchandise. Continued operation of the timer 204 actuates switches 256 and 258 and releases switch 206 to complete the cycle, stop the timer motor, and ready the machine for further use.

Having described in detail this invention, its numerous advantages will be appreciated. The use of a single photocell is but one of the particular advantages of this invention. When a plurality of cells are employed, problems are encountered because of drifting and the nonuniform effects of aging. While cells may initially be substantially identical, their output response to the same input may be different, particularly after some use.

It is evident that those skilled in the art may now make numerous modifications and departures from the specific system described herein without departing from the inventive concepts. Therefore, the invention is not to be construed as limited to the specific embodiment illustrated and described but rather the invention is to be construed only by the spirit and scope of the appended claims.

What is claimed is:

1. Object recognizing apparatus comprising a photosensitive device for providing a first signal representative of a first portion of said object, means operatively associated with the photosensitive device causing it to provide a second signal representative of a second portion of said object, means for differentially combining said first and second signals to provide a difference signal, and means responsive to said first signal, said second signal and said difference signal for providing a recognition signal indicative of said object having a predetermined characteristic only when said first, said second and said difference signals are related in a predetermined manner.

2. Object recognizing apparatus comprising a frame, a transport device mounted on the frame, means for energizing said device for conveying the object to a predetermined location on the frame, light responsive means disposed on the frame, means for alternately causing the same light responsive means to sense the intensity of the light source through different portions of the object, means for storing signals produced by the light responsive means generated by sensing the light through the different portions, means for weighting and differentially combining the signals stored for producing a third signal, and means sensitive to the characteristics of the stored and third signals and connected to the transport device for determining further direction of travel of the object on the frame.

3. Apparatus as defined in claim 2 further characterized by a plurality of switches actuated by said object being transported in one direction, and means sensitive to a selected sequence of operation of said switches indicating that the object has continued in said one direction over the frame.

4. Document recognizing apparatus comprising a mask for supporting a document to be recognized, a plurality of openings in said mask exposing different portions of the document to be recognized, shutters movable relative to the mask for alternately covering selected openings, a single photocell disposed in a position to sense the intensity of light passing through the different exposed portions of the document, means for storing the signals produced by the photocell in response to light passing through the different exposed portions of the document, means for weighting and combining the signals stored and producing a resulting signal and means responsive to the stored and resulting signals being related in a predetermined manner for providing a recognition signal.

5. Document recognizing apparatus as defined in claim 4 further characterized by a transport mechanism for moving said document in a selected direction in response to a recognition signal, a plurality of switches adapted to be sequentially actuated by movement of the document in the selected direction, and means sensitive to sequential operation of said switches.

6. Document recognizing apparatus comprising a light a single responsive means for receiving in sequence light from two separate areas of the document to be recognized, means connected to the light responsive means for storing two signals generated by the light responsive means which are representative of the intensity of the light from the two separate areas, means for weighting and differentially combining the signals to produce a difference signal, means amplifying each of the stored signals and the difference signal, and limiting means receiving the amplified signals and producing a reject pulse in the absence of a predetermined relationship among the three signals.

7. Apparatus as defined in claim 6 further characterized by an accept pulse established by one of the three signals and overridden by a reject pulse from any of the limiting means.

8. Apparatus as defined in claim 7 further characterized by a transport assembly for transporting the documents examined by the apparatus, and bidirectional drive means for the transport assembly causing the assembly to convey the document in one direction in response to an accept pulse and in another direction in response to a reject pulse.

9. Document recognizing apparatus as defined in claim 8 further characterized by first and second switching means positioned to be actuated sequentially by the document when conveyed in said one direction in response to an accept pulse, and signaling means responsive to actuation of the switching means in a prescribed sequence.

10. Object recognizing apparatus comprising signal means comprising a single photosensitive device for providing a first signal representative of a first portion of said object, means operatively associated with said photosensitive device for causing it to provide a second signal representative of a second portion of said object, said signal means further including a mask for supporting an object to be recognized, a plurality of openings in said mask for exposing different portions of the object to be recognized, shutters movable relative to the mask for alternately covering selected openings, said photosensitive device being disposed in a position to sense the intensity of light passing through the different exposed portions of said object; means for differentially combining said first and second signals to provide a difference signal, and means responsive to said first signal, said second signal and said difference signal for providing a recognition signal indicative of said object having a predetermined characteristic only when said first, said second and said difference signals are related in a predetermined manner.

References Cited by the Examiner

UNITED STATES PATENTS

| | | | |
|---|---|---|---|
| 2,482,242 | 9/1949 | Brustman | 340—149 |
| 2,731,621 | 1/1956 | Sontheimer | 340—149 X |
| 2,774,056 | 12/1956 | Stafford et al. | 340—149 |
| 2,922,893 | 1/1960 | Ett | 340—149 |
| 2,941,187 | 6/1960 | Simjian | 340—149 |
| 3,031,076 | 4/1962 | DeClaris et al. | 340—149 X |

NEIL C. READ, *Primary Examiner.*

IRVING L. SRAGOW, *Examiner.*

H. I. PITTS, *Assistant Examiner.*